(No Model.)  3 Sheets—Sheet 1.

R. SMITH.
MACHINE FOR TESTING PAPER, &c.

No. 274,146.  Patented Mar. 20, 1883.

Witnesses.
H. E. Lodge
Wm. T. Andrews

Inventor.
Richard Smith.
F. Curtis, Atty.

(No Model.) 3 Sheets—Sheet 2.

R. SMITH.
MACHINE FOR TESTING PAPER, &c.

No. 274,146. Patented Mar. 20, 1883.

Figure 4:
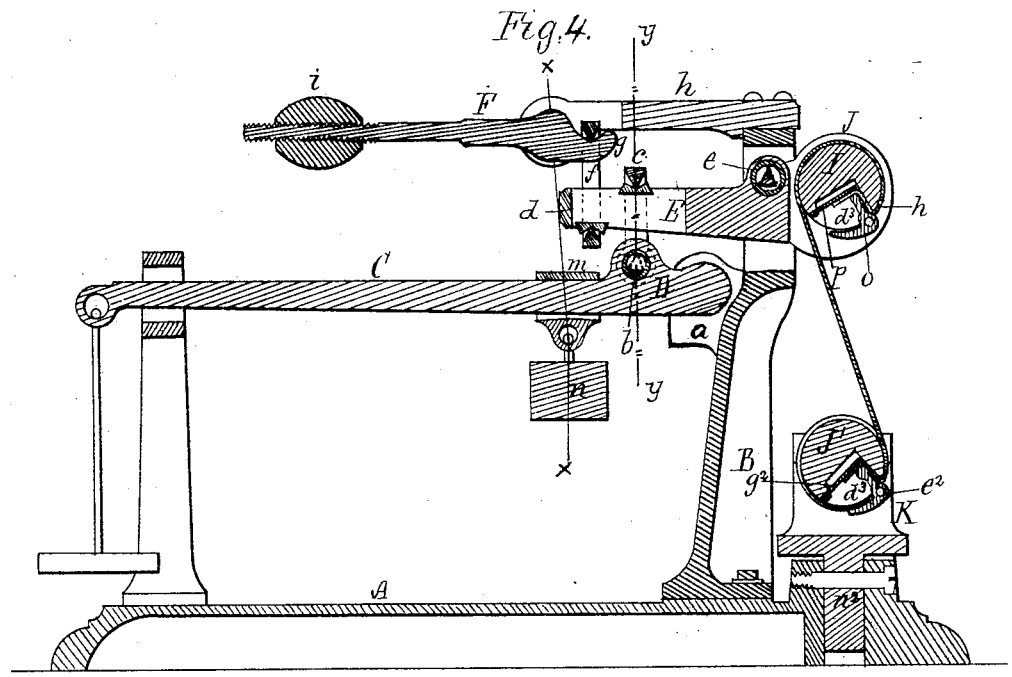

On line x-x of Fig. 4.

Witnesses.
H. E. Lodge
Wm. T. Andrews

Inventor.
Richard Smith.
J. Curtis. Atty.

(No Model.) 3 Sheets—Sheet 3.

R. SMITH.
MACHINE FOR TESTING PAPER, &c.

No. 274,146. Patented Mar. 20, 1883.

Witnesses.
H. E. Lodge
Wm. T. Andrews.

Inventor,
Richard Smith.
F. Curtis, Atty.

UNITED STATES PATENT OFFICE.

RICHARD SMITH, OF BOSTON, ASSIGNOR OF ONE-HALF TO GEO. W. RUSSELL, OF LAWRENCE, MASSACHUSETTS.

MACHINE FOR TESTING PAPER, &c.

SPECIFICATION forming part of Letters Patent No. 274,146, dated March 20, 1883.

Application filed November 19, 1881. (No model.)

*To all whom it may concern:*

Be it known that I, RICHARD SMITH, a subject of the Dominion of Canada, residing at Boston at present, in the county of Suffolk and State of Massachusetts, have invented certain new and useful Improvements in Machines for Testing Paper or other Articles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to machines for testing the tensile strength of meterials; and it consists in the construction and combination of devices hereinafter set forth and claimed, whereby that operation is effected.

It also consists in the peculiar construction of the clamps for holding the ends of the material while under strain.

Figure 1:
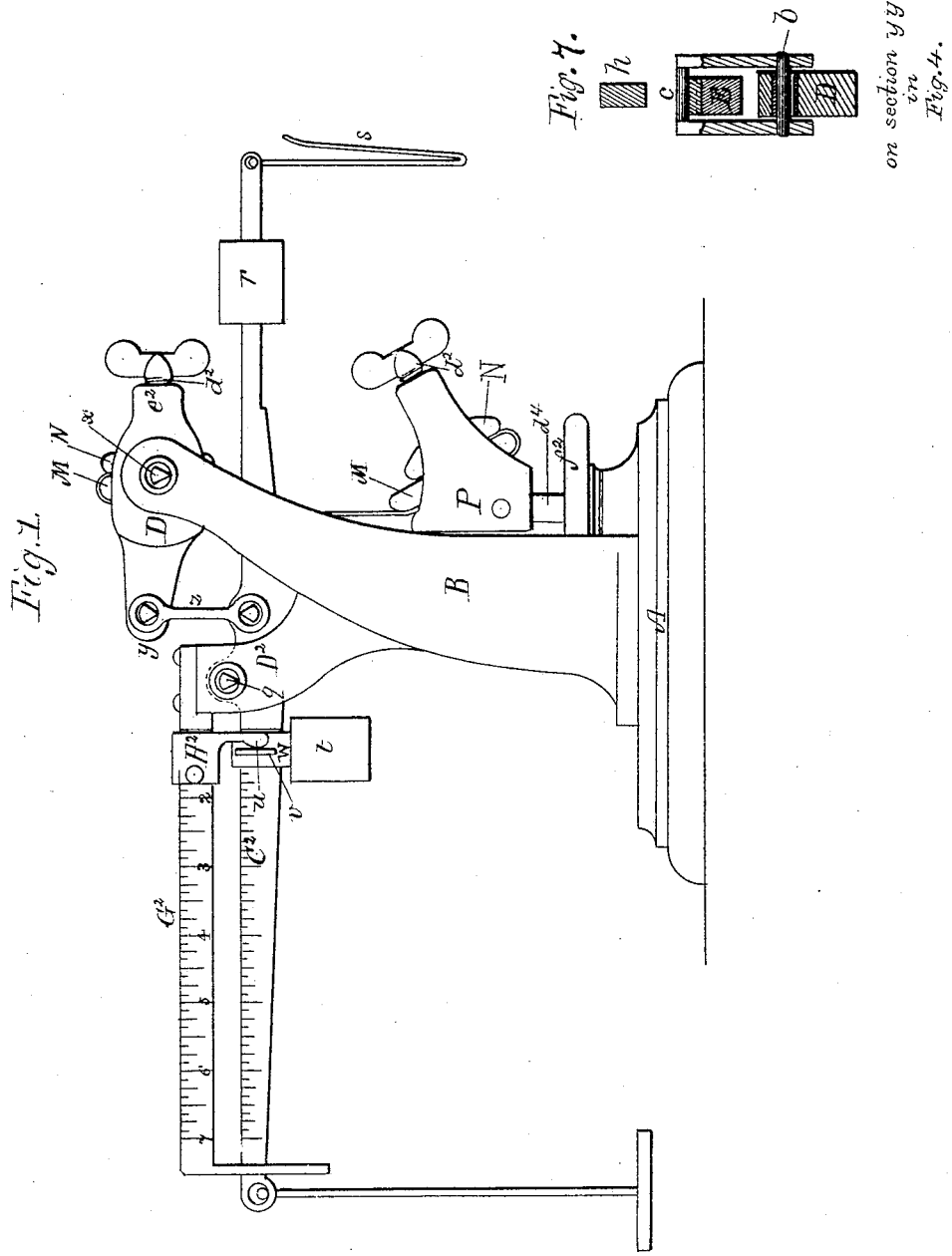
Figure 2:
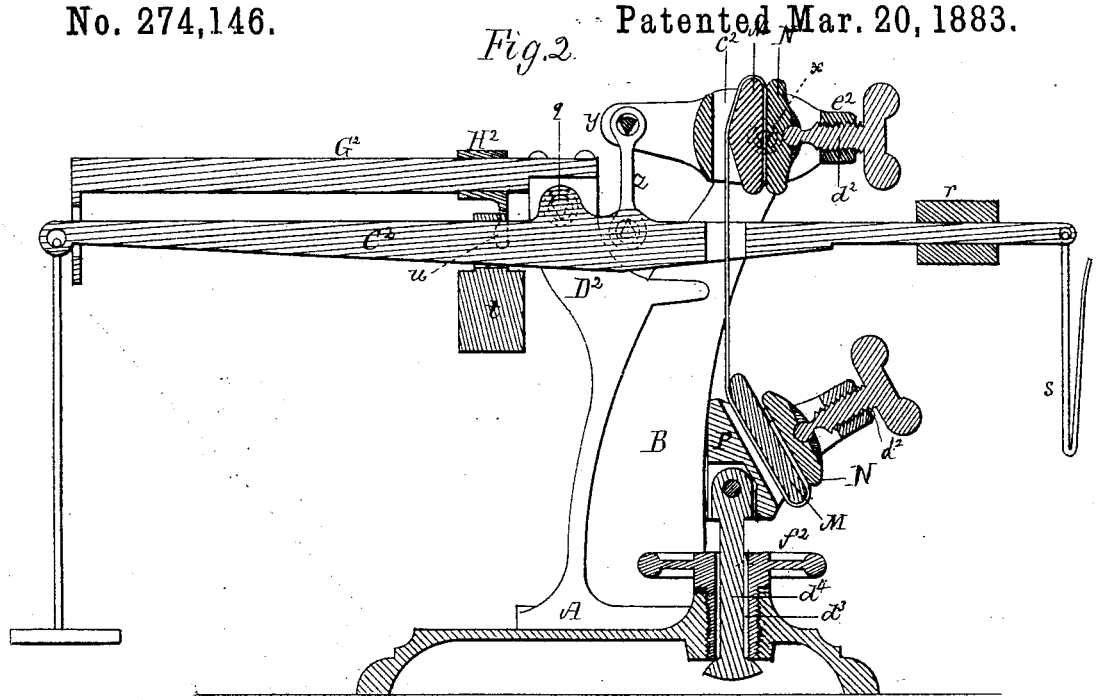
Figure 5:
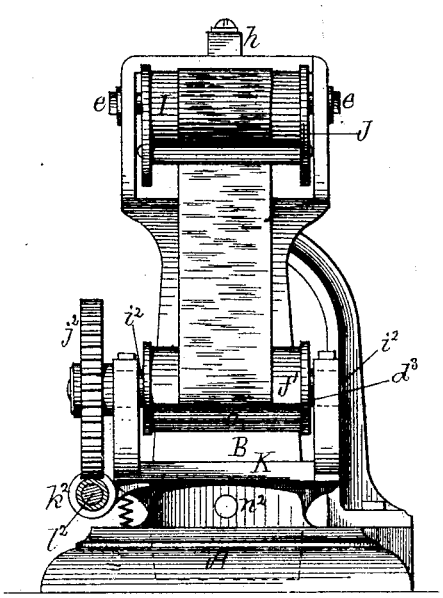
Figure 6:
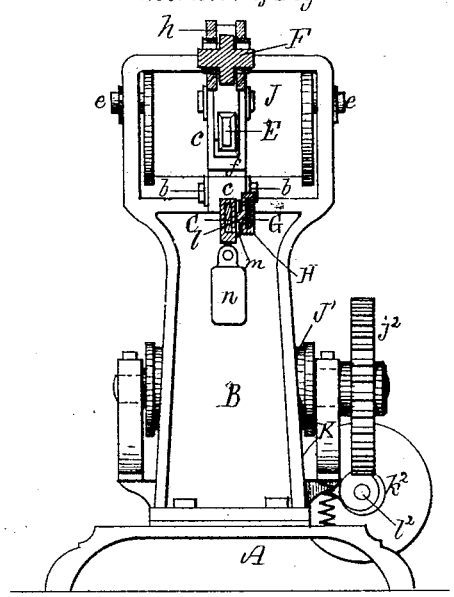
Figure 3:
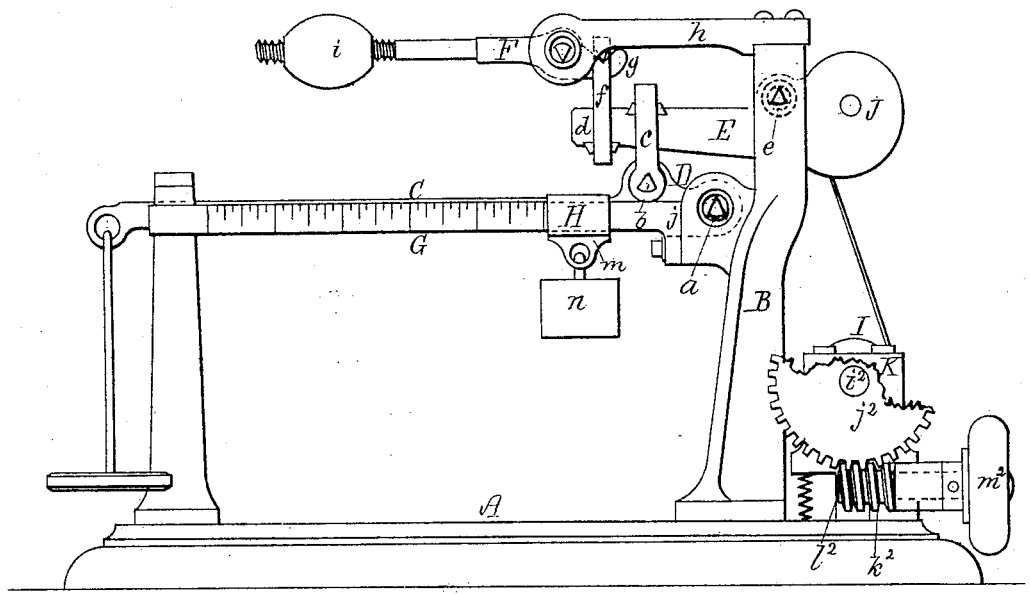

In the accompanying drawings, Figure 1 represents a side elevation of one of my improved machines adapted to test tensile strength and weigh materials. Fig. 2 represents a vertical longitudinal section of the same. Fig. 3 represents a side elevation of one of my improved machines adapted to test tensile strength, but not to weigh materials. Fig. 4 represents a vertical longitudinal section of the same. Fig. 5 represents an end elevation of the same; and Fig. 6 represents a vertical cross-section of the same on line $x\ x$ of Fig. 4, the said section being taken from end to end through and along the line of the beam. Fig. 7 is a vertical cross-section on line $y\ y$, Fig. 4.

As Figs. 3, 4, 5, and 6 represent the machine used for testing only, they will first be described, and afterward a description will be given of the mechanism for weighing as well as testing. (Shown in Figs. 1 and 2.)

Reference being had to the various figures, 4, 5, 6, and 7, of the above-named drawings, in which like letters indicate corresponding parts, it will be seen that A represents a flat table or bed-plate, adapted to rest upon a counter, bench, or other support, and having a vertical post or standard, B, erected upon one end of it.

C represents a horizontal beam, performing the functions of an ordinary scale-beam, but destitute of the ordinary scale of divisions upon its sides, such beam C being pivoted at its base or head D to the upper part of the post B by knife-edge bearings $a\ a$, of ordinary construction, which form the fulcrum for said beam, the beam in front of this fulcrum resting on a knife-edge bearing, $b$, in the lower end of a link, $c$, this link in turn being suspended at its upper end by knife-edge bearings from the tail $d$ of a horizontal vertically-oscillating lever, E, which is fulcrumed within the post B, above the beam C, on knife-edge bearings, as shown at $e$, while the extreme outer end of the tail of this lever E in its turn rests upon the lower part of a link, $f$, the upper end of such link $f$ being suspended from the head $g$ of a second horizontal lever, F, which is disposed above and in vertical alignment with the lever F and beam C, and is fulcrumed upon a horizontal bracket or bar, $h$, secured to the top of the post B and stretching out over the tablet A. The lever F has an adjustable weight, $i$, to counterpoise the beam C. By the employment of the intermediary levers E F, I make the leverage of the beam C compound, and am thus enabled to provide a compact and portable machine.

G in the accompanying drawings represents a thin horizontal plate, disposed edgewise alongside of and parallel with the beam C, this plate having upon one or both sides a scale of divisions denoting pounds and fractions, the said plate G being secured at its end rigidly to the upper part of the post B, as shown at $j$.

H in the accompanying drawings represents a sliding hub or clasp, mounted upon and adapted to traverse the scale-plate G, this slider having a lateral spur, $l$, upon one side to intercept the head $m$ of the weight $n$ of the beam C, and move said adjustable weight upon the beam C.

By placing the scale of divisions upon an independent immovable plate and employing a marker adapted to traverse this plate and read the scale, the vibrations of the beam have no effect to disturb the marker, and an exact measurement of the strength of the material to be tested may be had.

To seize the upper end of the strip or other object to be tested, I employ a clamp or lock, composed, as shown in Figs. 4 and 5 of the drawings, of a horizontal cylinder or drum, I, secured within the bifurcated head J of the lever E at right angles to the vertical plane of said lever, this cylinder or drum having a longitudinal recess, $d^3$, upon one side to contain an eccentric or cam block, $o$, which is pivoted at its ends within the head J, this eccentric bearing (when the strip is seized) upon an elastic seat or spring, $p$, secured at its ends to the ends of the bottom or lower side of the said recess.

When a strip of paper or other material is to be tested, one of its ends is inserted between the eccentric $o$ and the yielding seat or abutment $p$, and the eccentric then closed upon such strip to firmly grip the latter. The strip is now led about the upper corner, $h$, of the recess $d^3$, and partially about the exterior surface of the cylinder or hub I, thence downward to and inserted in the lower clamp. By the employment of the elastic seat $q$, I adapt the eccentric automatically to varying thicknesses of material and avoid fracture of the material at this point. By passing the strip about the corner $h$, I obtain a bight to prevent slipping of such strip between the eccentric and its yielding-seat, while by passing such strip about the periphery of the cylinder or hub to exert a draft upon such strip I avoid undue tension upon any restricted space in the surface of the strip and distribute the draft over a large extent of such surface.

The lower clamp is constructed precisely like the one last described. Its drum or cylinder is shown at J$'$, its recess for reception of the eccentric at $d^2$, its eccentric at $e^2$, and its elastic seat at $g^2$. In lieu, however, of securing the cylinder J$'$ immovable in its support, as with the upper one, I pivot it by end journals, $i^2 i^2$, within a head-stock or carriage, K, disposed below the head of the beam C and swiveled to the top of the table A, the cylinder J$'$ being rotated by means of a vertical gear, $j^2$, secured to one of its journals and engaged and driven by a worm, $k^2$, secured to or formed upon a horizontal worm-shaft, $l^2$, mounted in a bearing in one end of the above-named carriage, K, a suitable hand-wheel, $m^2$, being secured to one end of said shaft. As shown, in the present instance the carriage K is pivoted to the table by a joint, $n^2$, which permits of rocking motions at right angles to the lengths of the strip to be tested, this being in order that the draft or tension upon such strip may be uniform throughout its width. I propose, however, in some instances to mount the carriage K upon a universal or double-gimbal joint to permit of universal freedom of motion.

When it is desired to test the tensile strength of a strip of paper, cloth, or other material, or a cord or other object to which the instrument is adapted, the cylinder of the lower clamp should be turned until its cam or eccentric stands to one side in a convenient position to be reached by the attendant—for instance, as shown as in Fig. 5 of the accompanying drawings. The end of the strip after being led downward from the upper clamp, as before explained, is now secured within the lower clamp, as shown in said Fig. 5, and the cylinder J$'$ rotated in a direction to wind said strip about the periphery of such cylinder. The draft of the lower cylinder upon the strip raises the free end of the scale-beam, and the weight upon the latter is pushed outward by the adjustment of the marker H until the strength of the strip is overcome and such strip is fractured, the position of the marker H upon the scale of the plate G showing the number of pounds requisite to break the strip. The rotary cylinder J$'$ operates to first tighten the strip and raise the scale-beam, and afterward, if necessary, to take up any slack or stretch of said strip.

I propose, as before premised, to adapt this machine to weighing a sheet of paper or other object as well as to test the tensile strength of various materials. To this end I prefer to employ, in lieu of the compound levers E $h$, before described as operating the beam C, a single beam, C$^2$, (see Figs. 1 and 2 of the accompanying drawings,) fulcrumed approximately near its center to the top of a bracket, D$^2$, branching from upper part of the post B by knife-edge bearings, as shown at $q$.

To counterpoise the beam C$^2$, I mount upon its rear end a sliding or adjustable weight, $r$, while to support a sheet of paper or other article to permit it to be weighed I add to the same end of the beam a hook, clasp, or other support, $s$.

The ordinary weight of the beam C$^2$ is shown at $t$, and the ordinary scale of divisions may be engrossed upon such beam, as shown in Fig. 1 of the drawings, and the weight $t$ used directly with this scale when weighing is to be done.

To adapt the machine to testing the strength of materials in addition to its capability of weighing, as last described, I employ a horizontal plate, G$^2$, placed edgewise over the beam C$^2$, and supported rigidly at its end to the top of the bracket D$^2$, before named, this plate being inscribed upon one or both its sides, a scale of divisions representing pounds and fractions of pounds, similar to the scale of the beam C$^2$.

H$^2$ in said Fig. 1 represents a hub or grooved plate or slider, mounted upon and adapted to traverse the plate G$^2$. This slider or marker H having a pendent lip, $u$, to intercept a stud, $v$, projecting laterally from the side of the head $w$ of the weight $t$, and by means of which lip the weight may be adjusted upon the beam.

I have also shown in said Figs. 1 and 2 a modified construction of the clamps for confining the ends of the material, the strength of which is to be tested, which consists as follows: Within or to the extreme upper part of the post B, I pivot by knife-edge bearings $x$ a horizontal oscillating beam or head, D, one end, $y$, of which is pivoted to the upper end of a vertical link, $z$, the lower end of such link in turn being pivoted to the beam $C^2$ in rear of its pivots $q$. The central portion of the head or beam D is open, as shown at $c^2$, and this opening is spanned by a rigid stationary horizontal bar or abutment, M. While operating with the bar I employ an adjustable clamp-plate or jaw, N, swiveled to the end of a horizontal screw, $d^2$, which screws through the outer end bar, $e^2$, of the head D, the outer end of this screw having a suitable head for convenience in rotating it.

The lower clamp is constructed substantially like the upper. It has a head, P, open at its center, and provided with the bar M, clamp or jaw N, and screw $d^2$; but the head P is swiveled at its lower part to the top of a vertical bar or rod, $d^4$, which is contained loosely within the bore of the hub $d^3$ of a nut or hand-wheel, $f^2$, and is swiveled at its lower end to such hub in such manner as to prevent vertical play in the latter, but allow of lateral play, to permit it to adjust itself automatically to the tension of the paper. The hub of the nut or hand-wheel is screwed into the base-plate A of the machine. Hence by rotating such hand-wheel in one or the other direction the lower clamp is raised or lowered. When a strip of paper or other object is to be tested as to its strength in this modified form of the machine, one end of it is inserted between the abutment M of the upper clamp, and the jaw N of such clamp screwed down upon it to grip it firmly, and it is then carried upward about the exterior of the abutment M, thence downward to and partially about the outside of the bar M of the lower clamp and confined between such bar and the adjacent jaw N. Now, by rotating the nut $f^2$ and lowering the head P the beam $C^2$ is raised, and the weight $t$ pushed outward upon such beam until the material to be tested is broken. Should the material before breaking stretch to such an extent as to lower the beam, the latter is to be returned to its highest position by the rotation of the nut $f^2$, which lowers the head P and the lower clamp.

In this construction of the machine the independent scale upon the plate $G^2$ and the marker $H^2$, operating with such scale, may be dispensed with, or they may be retained and employed with the beam $C^2$, as may be desired.

So much of this specification as relates to the devices for weighing and testing tensile strength by means of the same machine will form the subject-matter of a separate application.

Having thus explained the nature and purposes of my invention, I claim as follows:

1. The clamping device consisting of a cylinder or hub, the elastic or yielding seat located in a peripheral recess of such cylinder, and the eccentric or cam operating with such elastic or yielding seat to grip one end of the material between them.

2. Lever E, having enlarged bifurcated head J formed at one end thereof, in combination with recessed cylinder I, secured in said head, and the eccentric attached to said head, and operating with said cylinder, substantially as set forth.

3. In combination with the clamp consisting of recessed cylinder I and eccentric $o$, the lower clamp consisting of cylinder J', having recess $d^3$, eccentric $e^2$, a vertically-adjustable support therefor, and the pin or bolt $n^2$ on which said support may be rocked for lateral adjustment, substantially as set forth.

4. The combination of worm $k^2$ and its shaft with wheel $j^2$, lower rotary cylinder, J', eccentric $e^2$, and the upper clamp, substantially as set forth.

In testimony whereof I affix my signature in presence of two witnesses.

RICHARD SMITH.

Witnesses:
   H. E. LODGE,
   F. CURTIS.